(12) United States Patent
Sarkar et al.

(10) Patent No.: US 6,292,938 B1
(45) Date of Patent: Sep. 18, 2001

(54) RETARGETING OPTIMIZED CODE BY MATCHING TREE PATTERNS IN DIRECTED ACYCLIC GRAPHS

(75) Inventors: Vivek Sarkar, Stamford, CT (US); Mauricio Jose Serrano, San Jose; Barbara Bluestein Simons, Palo Alto, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,210

(22) Filed: Dec. 2, 1998

(51) Int. Cl.$^7$ ........................................... G06F 9/45

(52) U.S. Cl. ................................................ 717/6

(58) Field of Search ........................... 717/6, 7, 5

(56) References Cited

U.S. PATENT DOCUMENTS

| | | | | |
|---|---|---|---|---|
| 4,782,444 | * | 11/1988 | Munshi et al. ................ | 364/300 |
| 5,175,856 | * | 12/1992 | Van Dyke et al. ............. | 395/700 |
| 5,493,675 | * | 2/1996 | Faiman, Jr. et al. ........... | 395/700 |
| 5,613,117 | * | 3/1997 | Davidson et al. ............. | 395/708 |
| 5,836,014 | * | 11/1998 | Faiman, Jr. et al. ........... | 395/707 |
| 5,894,576 | * | 4/1999 | Bharadwaj .................... | 395/709 |

OTHER PUBLICATIONS

Aho et al. Compilers, Principles, Techniques, and Tools. Addison–Wesley . pp. 546–554, Mar. 1988.*

Alfred V. Aho, Mahadevan Ganapathi, and Steven W.K. Tjiang, Code Generation Using Tree Mathing and Dynamic Programming, ACM TOPLAS, 11(4), Oct. 1989, pp. 491–516.

A.V. Aho, R. Sethi, and J.D. Ullman, Compilers: Principles, Techniques, and Tools, Addison–Wesley, 1986, pp. 290–293.

Ali–Reza Ald–Tabatabai, Geoff Langdate, Steven Lucco, and Robert Wahbe, Efficient and Language–Independent Mobile Programs, In Proceedings of the ACM SIGPLAN '96 Conference on Programming Language Design and Implementation, ACM Press, May 1996, pp. 127–136.

M. Auslander and M. Hopkins, An Overview of the PL.8 Compiler, Proceedings of the Sigplan '82 Symposium on Compiler Construction, 17(6):22–31, Jun. 1982.

M.E. Benitez and Jack W. Davidson, A Portable Global Optimizer and Linker, Proceedings of the SIGPLAN '88 Conference on Programming Language Design and Implementation, 23(7):329–338, Jun. 1988, Atlanta, Georgia.

Robert J. Blainey, Instruction Scheduling in the TOBEY Compiler, IBM Journal of Research and Development, 38(5):577–593, Sep. 1994.

The Standard Performance Evaluation Corporation, SEPC CPU95 Benchmarks, http://open.specbench.org/osg/cpu95/, ©1996–1999 (1997).

C.W. Fraser, R.R. Henry, and T.A. Proebsting, Burg–Fast Optimal Instruction Selection and Tree Parsing, In Proceedings of the ACM SIGPLAN Notices, 1992, 27(4):68–76, Apr. 1992.

Ron Cytron and Jeanne Ferrants, What's in a Name? Or the Value of Renaming for Parallelism Detection and Storage Allocation, Proceedings of the 1987 International Conference on Parallel Processing, pp. 19–27, Aug. 1987.

(List continued on next page.)

Primary Examiner—Kakali Chaki
Assistant Examiner—Wei Zhen
(74) Attorney, Agent, or Firm—Gates & Cooper LLP

(57) ABSTRACT

An optimizing, compiler that performs retargetable object code generation for a specific processor by matching tree patterns in directed acyclic graphs derived from the source code.

39 Claims, 11 Drawing Sheets

OTHER PUBLICATIONS

Ron Cytron, Jim Lipkis, and Edit Schonbert, A Compiler–Assisted Approach to SPMD Execution, Supercomputing 90, Nov. 1990, pp. 398–406.

Jack W. Davidson and Christopher W. Frase, The Design and Application of a Retargetable Peephole Optimizer, ACM TOPLAS, 2,(2):191–202, Apr. 1980.

Jack W. Davidson and Christopher W. Fraser, Code Selection Through Object Code Optimization, ACM TOPLAS, 6(4), Oct. 1984, pp 505–526.

David A. Dunn and Wei–Chung Hsu, Instruction Scheduling for the HP PA–8000, IEEE 1996, pp. 298–307.

H. Emmelman, F.W. Schroer, and R. Landwehr, BEG–A generator for Efficient Back Ends, Proceedings of the SIGPLAN 1989 Conference on Programming Language Design and Implementation, 23(7):227–237, Jul. 1989.

Christian Ferdinand, Helmut Seidl, and Reinhard Wilhelm, Tree Automata for Code Selection, Acta Informatics, (31):741–760, 1994.

C. Fraser, D. Hanson, A Retargetable C Compiler—Design and Implementation, The Benjamin/Cummings Publishing Company, Inc., 1995, pp 373–405.

C. Fraser and D. Hanson, and T.A. Proebsting, Engineering a simple, Efficient Code–Generator Generator, ACM Letters on Programming Languages and Systems, 1(3):212–226, Sep. 1992.

M. Ganapathi and Charles N. Fischer, Affix Grammar–Driven Code Generation, ACM Transactions on Programming Languages and Systems, 4(7):560–599, 1985.

R.S. Glanville and Susan L. Graham, A New Method for Compiler Code Generation, Proceedings of the Fifth Annual ACM Symposium on Principles of Programming Languages, Jan. 1978, pp. 231–240.

Roger Hoover and Kenneth Zadeck, Generating Machine–Specific Optimizing Compilers, Proceedings of the ACM SIGPLAN–SIGACT Symposium on Principles of Programming Languages, pp. 219–229, Jan. 1996.

Steven S. Muchnick, Advanced Compiler Design & Implementation, Morgan Kaufmann Publishers, Inc., San Francisco, California, 1997, pp 486–494.

Kevin O'Brien, Kathryn M. O'Brien, Martin Hopkins, Arvin Shepherd, and Ron Unrau, XIL and YIL: The Intermediate Languages of TOBEY, ACM SIGPLAN Notices, 30(3):71–82, Mar. 1995, (Proceedings of IR '95 Workshop Help in Conjunction with POPL '95 in San Francisco, California, Jun. 1992).

Todd A. Proebsting, Simple and Efficient BURS Table Generation, Proceedings of the ACM SIGPAN '92 Conference on Programming Language Design and Implementation, San Francisco, California, Jun. 1992, pp 331–338.

Michael J. Wolfe, Optimizing Supercompilers for Supercomputers, Pitman, London and The MIT Press, Cambridge, Massachusetts, 1989, In the series, Research Monographs in Parallel and Distributed Computing, pp 6–11 . .

Daniel Yellin, Speeding up Dynamic Trasitive Closure for Bounded Degree Graphs, Acta Informatics, 30:369–384, 1993.

* cited by examiner

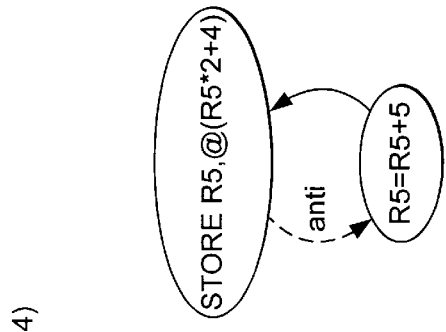
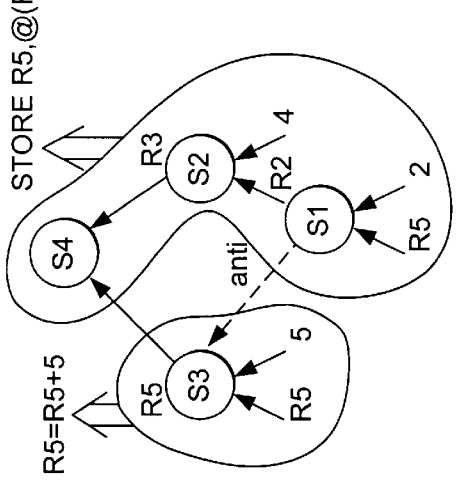
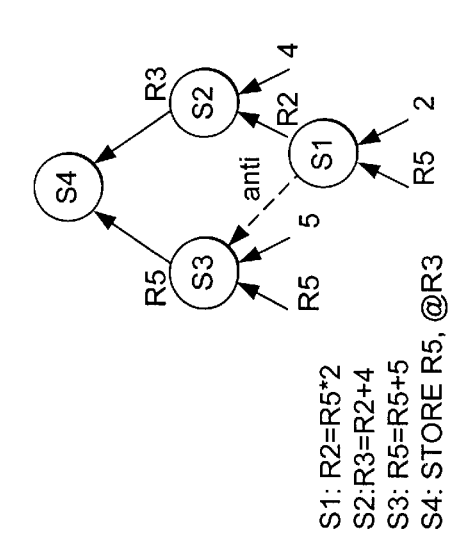
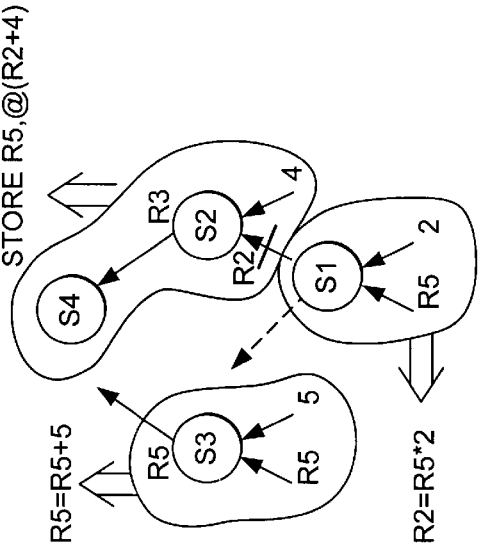
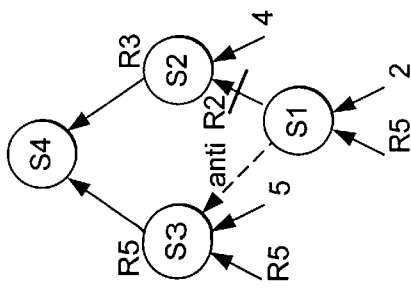
S1: R2=R5*2
S2: R3=R2+4
S3: R5=R5+5
S4: STORE R5, @R3
(a) Instruction Dependence Graph
(b) Output from Tree Pattern Matching
(c) Cycle in dependence graph
(d) Breaking the cycle
(e) Output from Tree Pattern Matching
(f) New dependence graph
FIG. 3

Grammar rule:

PATTERN
cr: COMPARE(AND(GPR,IV), ZERO)

ACTION
cr.C: = "TEST" + GPR.R + ",", + IV.V

COST = 1 where GPR is a    terminal representing a *general purpose register*
      IV is a     terminal representing a *constant integer value*
      cr.C =      synthesized *code* attribute for nonterminal cr
      GPR.R =     target *register* mapping attribute for terminal GPR
      IV.V =      constant *value* attribute of terminal IV Input IL:

AND gr1=gr1,10
COMPARE cr0=gr1,0

Basic block dag:

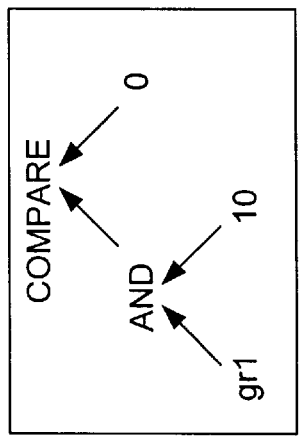

FIG. 4

Input grammar (relevant rules):

| PATTERN | | COST | ACTION |
|---|---|---|---|
| gpr: | addr | 2 | gpr.R := addr.R<br>gpr.C := "LEA" + gpr.R<br>+ "," + "[" + addr.C + "]" |
| gpr: | GPR | 0 | gpr.R := GPR.R<br>gpr.C := GRP.R |
| addr: | A(gprl,gprs) | 0 | addr.R := A.R<br>addr.C := gprl.C + "+" + gprs.C |
| gprl: | A(gprc,lg) | 0 | gprl.R := A.R<br>gprl.C := gprc.C + "+" + lg.C |
| gprc: | gpr | 0 | gprc.R := gpr.R<br>gprc.C := gpr.C |
| gprc: | LR(gprc') | 0 | gprc.R := LR.R<br>gprc.C := gprc'.C |
| gprs: | SLL4(gprc,IV2) | 0 | gprs.R := SLL4.R<br>gprs.C := gprc.C + "*4" |
| lg: | IV | 0 | lg.C := IV.V |

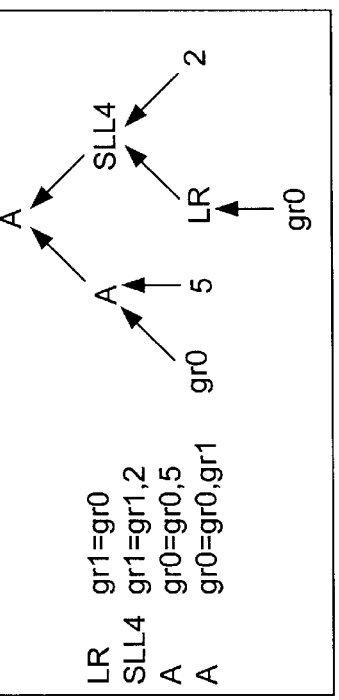

Input IL and basic block dag:

```
LR    gr1=gr0
SLL4  gr1=gr1,2
A     gr0=gr0,5
A     gr0=gr0,gr1
```

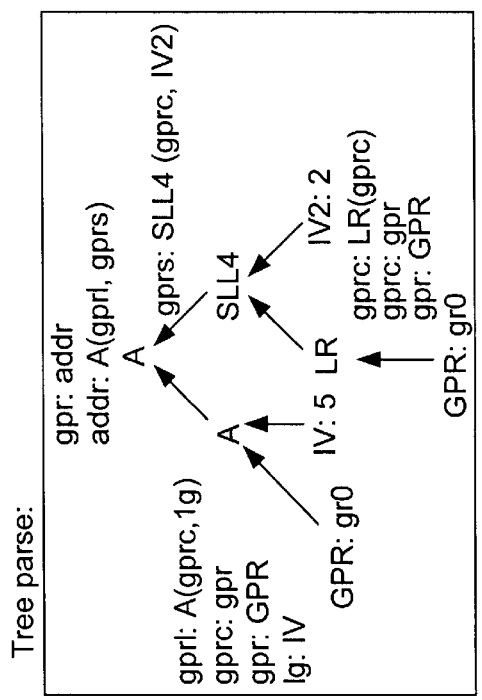

Tree parse:

RETARGETING OPTIMIZED CODE BY MATCHING TREE PATTERNS IN DIRECTED ACYCLIC GRAPHS

BACKGROUND OF THE INVENTION

1. Field of the Invention

The present invention relates to optimizing compilers for computer programs, and more specifically, to retargeting optimized code by matching tree patterns in directed acyclic graphs.

2. Description of the Related Art (Note: This application references a number of different publications as indicated throughout the specification by reference numbers enclosed in brackets, e.g., [x]. A list of these different publications ordered according to these reference numbers can be found in Section 9 of the "Detailed Description of the Preferred Embodiment." Each of these publications is incorporated by reference herein.)

Programmers write computer programs in high level languages such as assembler language, COBOL, FORTRAN, C, C++, etc. A group of statements written in a language is referred to as source code. Before the source code can be executed, the statements within the source code must be transformed to object code.

Much work has been devoted to building optimizing compilers that generate optimized object code. However, it is often difficult to modify an optimizing compiler built for one target processor to generate optimized object code for a different target processor.

There is also the problem of using tree pattern matching systems (e.g., TWIG [1], BEG [14], BURS [8, 17, 24]) to perform retargetable code generation after code optimization.

In the tree pattern matching approach, the target instruction set is specified by a set of tree patterns defined on the input intermediate language (IL). Analogous to the generation of parsing tables, the tree patterns are translated to pattern matching tables at "compiler-compile" time. An efficient dynamic programming method then uses these tables at compile-time to obtain a minimum-cost parse for each input tree of IL instructions. Automating the generation of pattern matching tables and the process of finding a minimum-cost tree parse leads to significant savings in the programming effort and complexity required for building a code generator. (The terms "tree parsing" and "tree pattern matching" are used interchangeably.)

However, there is a basic mismatch between the ILs that have been used for tree pattern matching and the ILs used by industry-strength optimizing back-ends. ILs used for tree pattern matching are typically structured as a list of expression trees. ILs used in industry-strength optimizing back-ends instead typically use a structure such as quadruples [2] or RTL [21] so as to get the maximum flexibility in code optimization. The optimized code for a basic block in such an IL is structured more generally as a Directed Acyclic Graph (DAG) of instruction nodes [2] defined by true dependences and augmented by anti, output and memory dependences [25]. Since DAGs cannot be fed into a retargetable code generator based on tree pattern matching, the challenge is to identify trees within each basic block DAG so that tree pattern matching can be used to generate correct and efficient target code from the optimized code for a basic block.

SUMMARY OF THE INVENTION

To overcome the limitations in the prior art described above, and to overcome other limitations that will become apparent upon reading and understanding the present specification, the present invention discloses a method, apparatus, and article of manufacture for performing retargetable object code generation for a specific processor by matching tree patterns in directed acyclic graphs derived from the source code.

An object of the present invention is to use a tree pattern matching system to perform retargetable code generation after code optimization. Another object of the present invention is to partition block directed acyclic graphs (DAGs), obtained from optimized intermediate code, into trees that can be input to the tree pattern matching system. Yet other objects of the present invention include providing a partitioning method, identifying legality constraints for the partitioning method, and incorporating duplication into the code generation.

BRIEF DESCRIPTION OF THE DRAWINGS

FIGS. 3(a)–(f) provide a simple example to illustrate some of the challenges in using tree pattern matching in the context of a retargetable optimizing back-end;

FIG. 4 illustrates a two-instruction tree pattern for the x86 processor;

FIG. 5 shows a tree parse for a more complex example;

DETAILED DESCRIPTION OF PREFERRED EMBODIMENTS

Figure 1:
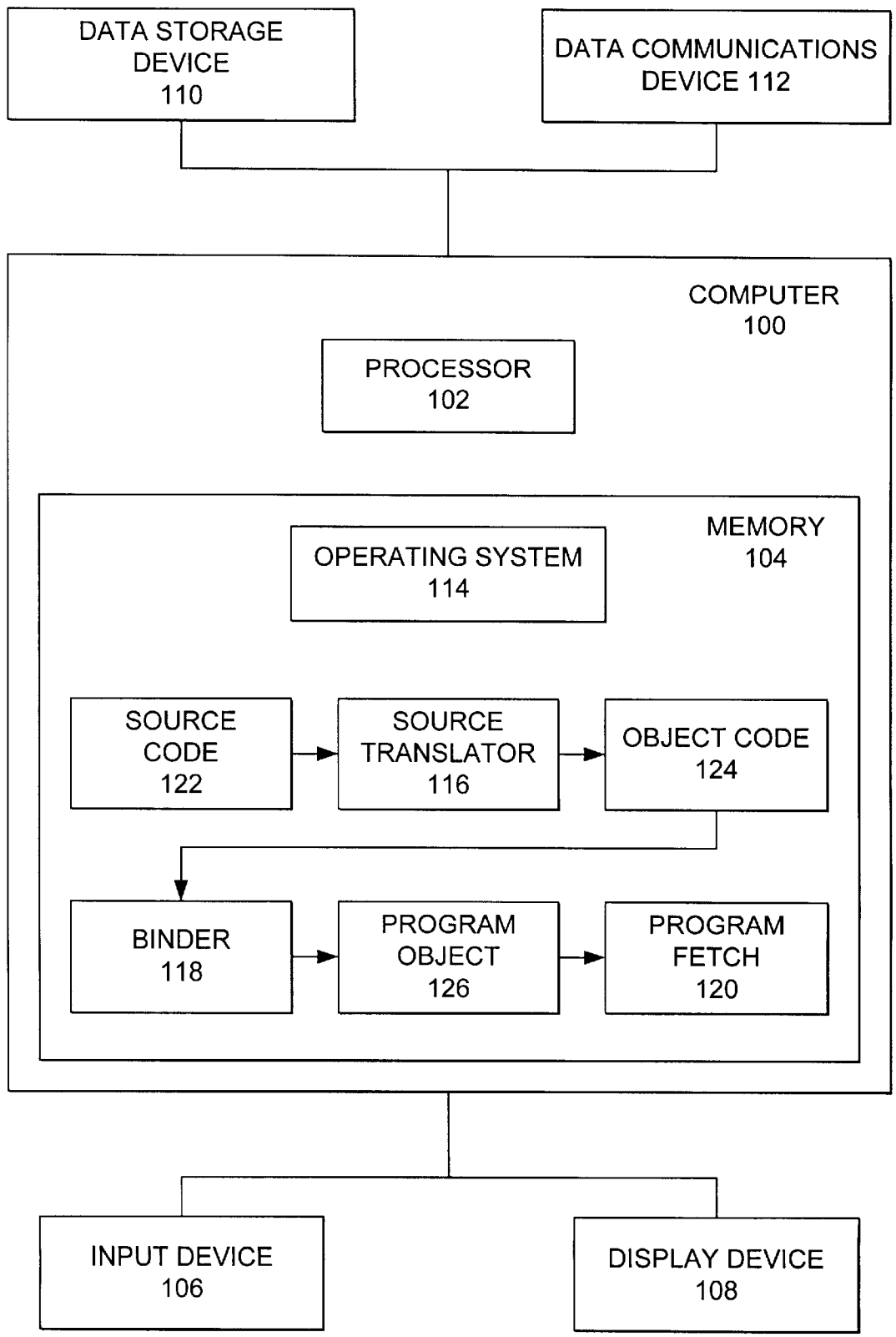
FIG. 1 is a block diagram illustrating an exemplary hardware environment that may used to implement the preferred embodiment of the present invention.

In the following description, reference is made to the accompanying drawings which form a part hereof, and in which is shown by way of illustration embodiments of the invention. It is understood that other embodiments may be utilized and structural changes may be made without departing from the scope of the present invention.

1. Overview

The present invention addresses the problem of using tree pattern matching systems to perform retargetable code generation after code optimization. The solution of the present invention is based on partitioning a basic block directed acyclic graph (DAG), obtained from optimized intermediate code, into trees that can be input to a tree pattern matching system. The present invention identifies legality constraints for the partitioning, provides a partitioning method, and describes how code duplication can be incorporated in this framework.

The solution provided by the present invention is based on a two-level partitioning. An optimized basic block DAG is first partitioned into trees that contain only true (data) dependence edges and in which each node has at most one true dependence out-edge. Such a tree of true dependences is called a fan-in tree. Each fan-in tree is then supplied as input to tree pattern matching. The output of tree pattern matching is a decomposition of the fan-in tree into patterns, which is represented as a second-level partition of each fan-in tree into subtrees. The present invention's goal for DAG partitioning is to find a minimum cost legal two-level partition of the entire DAG into subtrees. The present invention gives precise conditions based on data dependence theory [25] for identifying legal two-level partitions and provides an efficient greedy method as a heuristic solution. The present invention also extends this efficient greedy method to selectively perform duplication of IL instructions to further improve the quality of the target code.

In addition to retargeting optimized code in static compilers, it is anticipated that an important future application of the present invention's approach will be in retargetable code generation for mobile code systems, such as Java. A key requirement for mobile code is that it have a machine-independent intermediate form that can be conveniently translated/executed on different target processors. Retargeting the intermediate form becomes a greater challenge for larger sets of target processors, especially in embedded systems where there is a great proliferation of target processor instruction sets. However, the approach described in this application for retargeting optimized code by matching tree patterns in DAGs can be used to quickly build translators from virtual machines to several different target processors.

This application is organized as follows. Section 1 provides an overview and describes an exemplary hardware environment for the preferred embodiment of the present invention. Section 2 provides a simple example to illustrate some of the challenges in using tree pattern matching in the context of a retargetable optimizing back-end. Section 3 provides some background on retargetable code generation based on tree pattern matching by discussing two examples. Section 4 outlines the methods and solutions that have been developed for performing tree pattern matching on an instruction-level DAG for a basic block. Section 5 extends the results of Section 4 by showing how code duplication can be performed automatically to enhance tree pattern matching. Section 6 illustrates exemplary logic that could be performed by a source translator. Finally, Section 7 discusses related work, Section 8 contains a summary of the conclusions and outlines possibilities for future work, and Section 9 contains a list of cited references.

1. Hardware Environment

FIG. 1 is a block diagram illustrating an exemplary hardware environment that may be used to implement the preferred embodiment of the present invention. In the exemplary hardware environment, a computer 100 may include, inter alia, a processor 102, memory 104 (e.g., random access memory (RAM)), input devices 106 (e.g., keyboard, mouse pointing device, voice activated input device, etc.), display devices 108 (e.g., CRT, LCD displays, etc.), as well as a data storage devices 110 (e.g., hard, floppy, and/or CD-ROM disk drives, etc.), and/or data communication devices 112 (e.g. modems, network interfaces, etc.). It is envisioned that attached to the computer 100 may be other devices, such as a read only memory (ROM), a video card, bus interface, printers, etc. Those skilled in the art will recognize that any combination of the above components, or any number of different components, peripherals, and other devices known in the art, may be used with the computer 100.

The computer 100 operates under the control of an operating system (OS) 114, such as OS/390™, MVS™, VM™, OS/2™, AIX™, UNIX™, WINDOWS™, MACINTOSH™, etc. The operating system 114 is booted into the memory 104 of the computer 100 for execution when the computer 100 is powered-on or reset. In turn, the operating system 114 then controls the execution of one or more computer programs, such as a source translator 116, binder 118, and program fetch 120.

The source translator 116, which usually is a compiler, interpreter, or assembler, analyzes a source code module 122 containing one or more programming statements. The source code 122 is generally stored in a text file on the data storage device 110 and/or entered interactively by a programmer from an input device 106. The source translator 116 synthesizes an object code module 124 from the source code module 122. The binder 118 receives as input one or more object code modules 124 or a combination of object code modules 124 and program objects 126, and produces a program object 126 as output. The program fetch 120 loads the executable text from the program object 126 into memory 104 for execution by the processor 100.

The source translator 116, binder 118, program fetch 120, source code module 122, object code module 124, and program objects 126 are comprised of logic and/or data which, when accessed, interpreted, and/or executed by the processor 102, cause the computer 100 to perform the steps necessary to implement and/or use the present invention. Generally, the source translator 116, binder 118, program fetch 120, source code module 122, object code module 124, and program objects 126 are embodied in and/or readable from a device, carrier or media, such as memory 104, data storage device 110, and/or a remote device coupled to the computer 100 via the data communications device 112.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data embodied in and/or readable from any device, carrier, or media. Of course, those skilled in the art will recognize many modifications may be made to this configuration without departing from the scope of the present invention.

Figure 2:
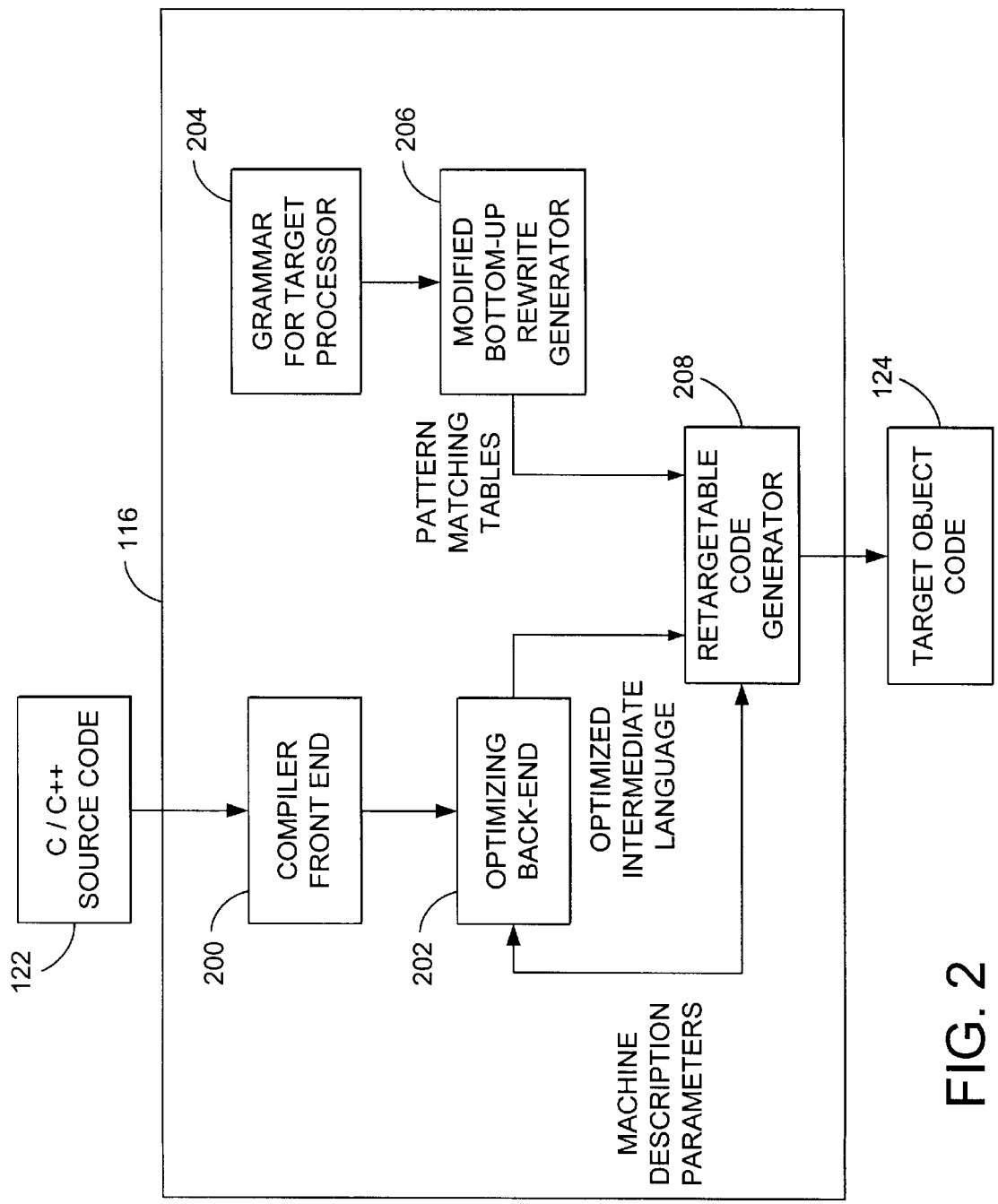
FIG. 2 shows the structure of a source translator according to the preferred embodiment of the present invention.

Those skilled in the art will recognize that the exemplary environment illustrated in FIG. 1 is not intended to limit the present invention. Indeed, those skilled in the art will recognize that other alternative hardware environments and programs may be used without departing from the scope of the present invention. 1.2. Source Translator Structure FIG. 2 illustrates the structure of an exemplary source translator 116 (e.g., a compiler) that could be used to implement the preferred embodiment of the present invention.

Source code 122, such as C or C++, is accepted by a compiler front end 200 and then translated to an intermediate language (IL) by a optimizing back-end 202. C and C++ were chosen as the programming languages in this example, although the structure shown in FIG. 2 can also be used to build source translators for other languages, such as Fortran, Java, PL/1, Cobol, etc.

A machine grammar 204 is fed into a modified, bottom-up, rewrite generator (MBURG) 206 to obtain a set of pattern matching tables for a specific target processor. In addition, machine-specific parameters (e.g., description of register sets for the target processor) are fed into both the optimizing back-end 202 and a retargetable code generator 208.

The retargetable code generator 208 implements the partitioning and duplication methods outlined in Sections 4 and 5 below. Its input is the IL that is generated towards the end of the optimization steps performed by the optimizing back-end 202. In the preferred embodiment, this point is just after global register allocation. This means that, even though the input IL to the retargetable code generator 208 is architecture-neutral (i.e., it does not reflect a specific target instruction set), a target-processor-specific global register allocation has already been encoded in the structure of the IL. If the retargetable code generator 208 is used to translate mobile code, then the IL should be sent to the retargetable code generator 208 at a point that precedes global register allocation.

The output of the retargetable code generator 208 is object code 124 for the target processor that is generated by performing tree pattern matching (Step 314). Those skilled in the art will recognize that the object code 124 may comprise either assembly code or binary code, as desired.

2. An Example Dag

FIGS. 3(*a*)–(*f*) provide a simple example to illustrate some of the challenges in using tree pattern matching in the context of a retargetable optimizing back-end 202.

FIG. 3(*a*) shows a basic block, comprised of four IL instructions labeled as S1, S2, S3, and S4, and its data dependence graph [25] which contains one node per instruction and true/anti data dependence edges connecting the nodes. The true dependence edges are shown as solid lines, and the anti dependence edge is shown as a dotted line (there are no output data dependence edges in this example). Renaming [9] can be used to reduce the number of anti and output dependences. It is assumed that the optimizing back-end 202 performs as much renaming as possible on symbolic registers without inserting extra register-copy instructions (the symbolic registers that result from this kind of renaming are sometimes referred to as webs [22]). However, in general, this renaming may not be able to remove an anti dependence edge such as the edge from S1 to S3 in FIG. 3(*a*). For example, if the program contains a later merge/join of the definition of register R5 in S3 and a definition of R5 that reaches the use of R5 in S1, then removal of the anti dependence edge by renaming would require the insertion of a register-copy instruction.

Loop-carried dependences are not relevant to tree pattern matching. Therefore, the data dependence graph, comprised only of loop-independent dependences for IL instructions in a basic block, will be a DAG. In this example, the true data dependence edges, or true edges for short, form a fan-in tree which could be used as input to a tree pattern matching system.

FIG. 3(*b*) shows a possible output partition obtained by naively performing tree pattern matching on the fan-in tree comprised of true edges from the DAG in FIG. 3(*a*). It this example, the partition is comprised of two subtrees, each of which matches a pattern in the target machine grammar. One subtree is comprised of nodes S1, S2 and S4, and the other subtree is comprised of just node S3. The grammar rules in a tree pattern matching system also specify what target instructions should be generated for each subtree that is recognized. In this example, IL instructions S1, S2 and S4 are translated into one target instruction, STORE R5,@(R5*2+4), and IL instruction S3 is translated into another target instruction, R5=R5+5 (these target instructions are found in many processor architectures). While each individual target instruction is a locally correct translation of its subtree, the overall translation shown in FIG. 4(*b*) is incorrect because the generated STORE instruction uses the same value of register R5 for indexing and as the value to be stored. However, the original STORE instruction in the IL used the "old" value of register R5 for indexing and the "new" value of register R5 (computed by S3) as the value to be stored. The property that caused the partition from FIG. 3(*b*) to generate incorrect target code is the presence of a dependence cycle between the two subtrees.

FIG. 3(*c*) shows the target dependence graph (SuperNode Graph) in which each node (SuperNode) represents a target instruction, which corresponds to a subtree (pattern) in the IL dependence graph. An edge in the target dependence graph (superedge) corresponds to an edge from the IL dependence graph that crosses a subtree boundary, i.e., goes between a pair of SuperNodes. The superedges constrain the ordering of target instructions or SuperNodes. It can be observed that there is a cycle in the SuperNode Graph in FIG. 3(*c*). In the solution of the present invention, this indicates that the partition obtained from tree pattern matching is illegal. An illegal partition is obtained when the combining of IL instructions into SuperNodes leads to a violation of the ordering constraints that must be obeyed by the IL instructions.

A node that is in a cycle is a "pot (potential) cut node" if it has either two true out-edges or one true out-edge leading to another node in the same SuperNode and at least one non-true out-edge leading to another node that is not in the same SuperNode. FIG. 3(*d*) illustrates how the present invention breaks a cycle by selecting a pot cut node in the IL dependence graph. When a node is "cut", it is made into the root of a separate tree in the input for tree pattern matching. S1 is a pot cut node in the IL dependence graph. By cutting S1, the present invention eliminates the cycle in the SuperNode Graph. After cutting, tree pattern matching is performed separately on two fan-in trees of true edges. The first tree contains the singleton node S1, and the second tree contains the nodes S2, S3, and S4.

FIG. 3(*e*) shows a possible output partition obtained by performing tree pattern matching separately on the two trees identified in FIG. 3(*d*). This partition is comprised of three subtrees, each of which matches a pattern in the grammar for the target processor. One subtree comprises only node S1, and is translated to the target instruction R2=R5*2. Another subtree is comprised of only node S3, and is translated to the target instruction R5=R5+5. The third subtree is comprised of nodes S2 and S4, and is translated to the target instruction STORE R5,@(R2+4). The SuperNode Graph for this partition is showed in FIG. 3(*f*). Since the SuperNode Graph is acyclic, it is known that the translation is correct. 3. Examples of Tree Pattern Matching This Section provides some background on retargetable code generation based on tree pattern matching by discussing two examples. Detailed information on tree pattern matching can be found in [1, 24, 17, 15] and the references contained therein.

The key benefit of tree pattern matching systems lies in their automating the steps of generating pattern matching tables and of finding a minimum-cost tree parse. Separating the grammar of the target processor from the implementation of the compiler helps enormously with retargeting the compiler. The small size and declarative nature of grammars makes it relatively easy to write grammars for different target processor architectures. For example, the grammars that described herein contain 216 rules for the INTEL x86 processor and 230 rules for the HEWLETT-PACKARD (HP) PA-RISC processor.

FIG. 4 illustrates a two-instruction tree pattern for the x86 processor. The first input IL instruction performs a bitwise AND between the general-purpose register gr1 and the integer constant 10, and stores the result in gr1. The second input IL instruction performs a signed 4-byte COMPARE of gr1 with zero, and stores the result in condition register cr0.

The grammar rule for this pattern contains nonterminal cr (for "condition register") and terminals GPR, IV, COMPARE, AND, ZERO. The ACTION field of this grammar rule dictates that the specified combination of AND and COMPARE instructions can be translated to a single target TEST instruction for the x86 processor.

The COST field (=1, in this example) is an estimate of the execution time (in cycles) of the generated target instruction. For convenience, most tree pattern matching systems allow COST to be specified as a function of the actual input IL statements that match the pattern, if a constant cost is inappropriate.

The code generated for this example is "TEST gr1,10". It is synthesized in the .C attribute of nonterminal cr. (The symbol+is used to represent string concatenation in the semantic rule for computing attribute cr.C.) The generated instruction uses register name gr1 from the input IL, which will need to be translated to a target register name. If gr1 was assigned a register (e.g., register EDX in the x86 architecture) during a global register allocation phase prior to pattern matching, then the target register (EDX) should be substituted for gr1 in the target instruction. If all register allocation is performed after pattern matching, the generated target code will contain virtual/symbolic registers as in the input IL.

FIG. 5 shows a tree parse for a more complex example. The terminals used in this example are LR (load-register), A (add), SLL4 (4-byte shift left), GPR (general purpose register), and IV (integer value). As in FIG. 4, the entire tree matches one pattern and is translated to a single instruction, "LEA gr0,[gr0+5+gr0*4]", which is synthesized in the .C attribute of the root gpr nonterminal. The .R attribute in the grammar stores the output register for a nonterminal. (A second .R2 attribute is used for instructions that have two output registers.) For a copy production of the form a: b, simply set a.R:=b.R. For any other production of the form a: T( . . . ), set a.R:=T.R to be the output register of the (terminal) root instruction of the pattern.

Note that register gr1 does not appear in the generated target instruction. This is referred to as a "disappearing register." A disappearing register can sometimes lead to disappearing anti-dependence edges in the target (SuperNode) dependence graph. Also, nonterminal gprc represents a zero-cost chain of LR instructions, and is an example of how the grammar can be used to automatically "coalesce" a chain of register-copy instructions. 4. Performing Tree Pattern Matching on an Instruction DAG This Section outlines the methods and solutions that have been developed for performing tree pattern matching on an IL DAG that represents the dependence graph for a basic block. Section 4.1 defines the dependence graph that is built for IL instructions in a basic block, based on def-use chains [2] computed by the optimizing back-end 202. Section 4.2 discusses how the trees from an IL DAG are fed into a pattern matching system to obtain target instructions from subtree patterns. Since tree pattern matching can create cycles in the dependence graph for the target machine, Section 4.3 addresses correctness issues related to breaking cycles among target instructions. 4.1 Building the Dependence Graph The output of the optimizing back-end 202 is a sequence of optimized IL instructions (such as quadruples) for each basic block. An instruction-level dependence graph, constructed from the IL instructions in a given basic block, models register-true dependences and other dependences (register anti/output dependences, memory true/anti/output dependence, control dependences) [25]. If global register allocation is performed after pattern matching, the register dependences are defined on symbolic/virtual registers. If global register allocation is performed before pattern matching, the register dependences will be defined on physical registers (local allocation of physical registers in a basic block may change after target code has been generated).

It is tempting, for the sake of efficiency, to exclude transitive edges from the instruction-level dependence graph. Non-true edge (u,v) could be excluded if there exists a directed path of true edges from u to v and there is not a fan-out node in the path. However, not all transitive edges are redundant for tree pattern matching. It is not correct in general to remove a non-true edge (u,v) that is redundant with respect to some other non-true edge (w,x) contained in a path from u to v, because (w,x) may be eliminated in the target instruction dependence graph due to disappearing registers. Then, (u,v) would not be redundant in the target DAG. Register-output dependences will usually be redundant. However, they have been included for the sake of completeness, to correctly handle the case when a value stored in a register is dead, even though it is expected that this case would rarely be seen in practice.

There are some normalizing transformations that are performed on the IL DAG in preparation for tree pattern matching. The present invention creates a LIVE_ON_EXIT node in the DAG to represent the completion of the basic block. For each register value that is generated in the basic block and is LIVE_ON_EXIT, the present invention inserts a true-dependence edge from the IL instruction that generated the register value to the LIVE_ON_EXIT node. The present invention also creates explicit nodes for each constant value in the basic block and for each register value in the basic block that is live on entry, so that these nodes can be referred to in the grammars. 4.2. Tree pattern Matching and Generation of Target Instructions The example in FIGS. 6(a)–(c) illustrates the procedure of tree pattern matching and generation of target instructions for a given basic block DAG.

Figure 6:
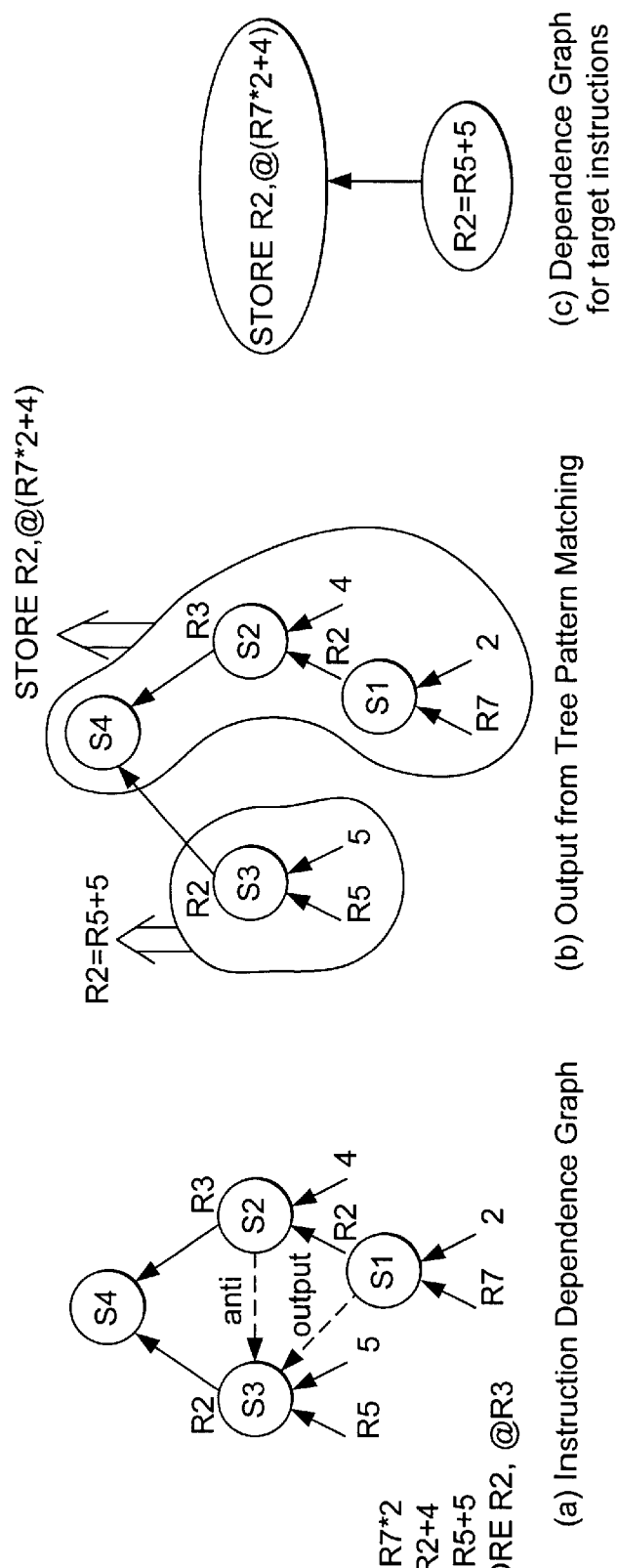
FIGS. 6(a)–(c) illustrate a procedure of tree pattern matching and generation of target instructions for a given basic block directed acyclic graph.

FIG. 6(a) shows a basic block comprised of four IL instructions, S1, S2, S3, and S4, and its IL DAG. The true edges form a single fan-in tree that serves as input for tree pattern matching.

FIG. 6(b) shows the result after tree pattern matching. IL instructions S1, S2, and S4 are combined into a single target instruction, STORE R2,@(R7* 2+4). The remaining IL instruction, S3, is translated to the target instruction R2=R5+5.

FIG. 6(c) shows the SuperNode Graph. Note that the register anti and output dependences from the original IL instructions have disappeared from the target instructions, because the definition and use of R2 in IL instructions S1 and S2 have been internalized into the target instruction, STORE R2,@(R7*2+4). Because of these disappearing registers, there is no cycle. 4.3. Breaking Cycles in the Target Dependence Graph As illustrated in Section 2, tree pattern matching on optimized code may produce cycles among two or more SuperNodes. A necessary condition for the creation of cycles after tree pattern matching is the presence of non-true dependence edges in the IL DAG. Consequently, if a basic block contains only true dependence edges, it is not necessary to test for cycles in the SuperNode Graph, which will always be acyclic.

Theorem 4.1 below states that for every SuperNode Graph cycle there must be an input pot cut node contained in one of the SuperNodes in the cycle, the cutting of which will eliminate the cycle. This result is used in the present invention to iteratively cut selected pot cut nodes in the input DAG until all cycles have been eliminated from the Super-Node Graph.

Theorem 4.1. The presence of a pot cut node is a necessary condition for the existence of a cycle among target instructions.

Proof: Assume there is a cycle $C=X_0X_1 \ldots X_kX_0$ in the SuperNode Graph. Suppose for contradiction that none of the IL DAG nodes that correspond to the SuperNodes in C is a pot cut node. To simplify the terminology, let $(X_i^{out}, X_{i+1}^{in}+_1), 0 \leq i \leq k-1$ be an edge in the IL DAG that corresponds to the edge $(X_i, X_{i+1})$ in the SuperNode Graph, with $(X_k^{out}, X_0^{in})$ being an edge in the IL DAG that corresponds to the edge $(X_k, X_0)$. If $X_i^{in} = X_i^{out}$ for all $0 \leq i \leq k$, then there is a cycle in the in the IL DAG, a contradiction. Therefore, there is some j, $0 \leq j \leq k$, such that $X_j^{in} \approx X_j^{out}$. Induction is now used. Assume, initially, that there is only one value of j, say J, such that $X_J^{in} \approx X_J^{out}$. By assumption, none of the IL DAG nodes that correspond to $X_i$ is a cut node. Therefore, there is an undirected path of true edges in the IL DAG from $X_J^{in}$ to $X_J^{out}$.

Case 1: the path from $X_J^{in}$ to $X_J^{out}$ contains only the nodes $X_J^{in}, X_J^{out}$. If that path corresponds to the IL DAG edge $(X_J^{in}, X_J^{out})$, then again there is a cycle in the IL DAG. Therefore, the path must correspond to the edge $(X_J^{in}, X_J^{out})$. But, then $X_J^{out}$ is a pot cut node, a contradiction.

Case 2: the undirected true path from $X_J^{in}$ to $X_J^{out}$ corresponds to more than a single edge in the IL DAG. It can be observed that the directed edges cannot form a path from $X_J^{in}$ to $X_J^{out}$, since that would again imply the existence of a cycle in the IL DAG. Also, there cannot be a true directed edge from $X_J^{out}$ to some other node in $X_J$, since that would imply that $X_J^{out}$ is a pot cut node. Therefore, there must be some node $X_J^{middle}$ that contains two outgoing true edges from the true path from $X_J^{in}$ to $X_J^{out}$. But, this implies that $X_J^{middle}$ is a pot cut node.

The induction argument is straightforward.

In the example of FIGS. 3(a)–(f), the present invention identifies S1 as a pot cut node, since it has both a true out-edge and an anti out-edge. Selecting S1 as a cut node prevents the formation of the cycle by preventing IL instructions S1, S2 and S4 from being combined via tree pattern matching. (IL instructions S2 and S4 can still be combined.) However, in general, cutting a single pot cut node that is in a cycle does not necessarily eliminate the cycle.

The overall method for tree pattern matching on an IL DAG is structured as follows:

1. Mark each fan-out node as a cut node.

2. Cut all nodes marked as cut nodes to create a forest of in-trees on the subgraph of true dependence edges.

3. Run MBURG 206 on trees defined by true edges and cut nodes, and create SuperNodes.

4. Test for cycles. Initially, for each edge in the IL DAG, there is a corresponding superedge in the SuperNode Graph. Run incremental transitive closure [26] on the SuperNode Graph by first considering each IL DAG edge that has as its source an IL instruction that is the root of a SuperNode identified in step 3. For each such IL DAG edge, add its corresponding superedge to the SuperNode Graph if it is not already present. Since none of these IL DAG nodes can be a pot cut node, this stage will not create a cycle in the SuperNode Graph.

5. Next, add to the incremental transitive closure all superedges that correspond to IL DAG edges that were not examined in the previous step. For the first IL DAG edge (x, y) that creates a cycle in the SuperNode Graph, mark x as a cut node and go back to step 2. Since x is not the root of a SuperNode, it must have an outgoing true dependence edge in the tree and an outgoing anti dependence edge to another instruction tree, i.e., x must be a pot cut node.

If no cycle is detected, the method is done. 5. Use of Code Duplication to Enhance Tree Pattern Matching This Section extends the results of Section 4 by showing how code duplication can be performed automatically to enhance tree pattern matching. The method described in Section 4.3 marks each fan-out node as a cut-node. While correct, it precludes the possibility of finding a tree pattern match in which a fan-out node is combined with one or more of its parents in the IL DAG. This Section discusses how to duplicate the entire subtree/subgraph rooted at a fan-out node prior to tree pattern matching, provided it's not illegal or expensive to do so. The experimental results reported in Section 6 show an average run-time improvement of 9% for the SPECint95 benchmarks due to code duplication when generating x86 code.

The present invention first considers the legality issues of duplicating IL instructions. The side effect legality constraint states that it is illegal to duplicate an instruction that may have a side effect, such as a call instruction or a LOAD/STORE instruction on a volatile memory location, because doing so can change the run-time behavior of the program. It is assumed that each IL instruction has a flag/attribute indicating whether or not the instruction may have a side effect. If any descendant of a fan-out node is an instruction with a side effect, then the present invention directly marks the fan-out node as a cut-node and does not attempt to duplicate it.

The cycle legality constraint states that duplication should not create a cycle in the SuperNode Graph. This constraint is analogous to the legality constraint for redundant execution of SPMD code [10]. For example, duplicating an IL instruction such as R1=R1+1 will lead to a cycle in the SuperNode Graph due to the presence of symmetric anti dependences on register R1 between two copies of the instruction. However, if both copies of the IL instruction are combined with their parents during tree pattern matching, then R1 will be a disappearing register. In this case, the anti dependences and the cycle disappear from the SuperNode Graph, thus making the duplication legal. Another way of removing register-anti dependences, and hence the cycle, from the SuperNode Graph is by renaming [9] register R1 in each duplicated copy.

The example in FIGS. 7(a)–(d) illustrate the cycle legality constraint.

Figure 7:
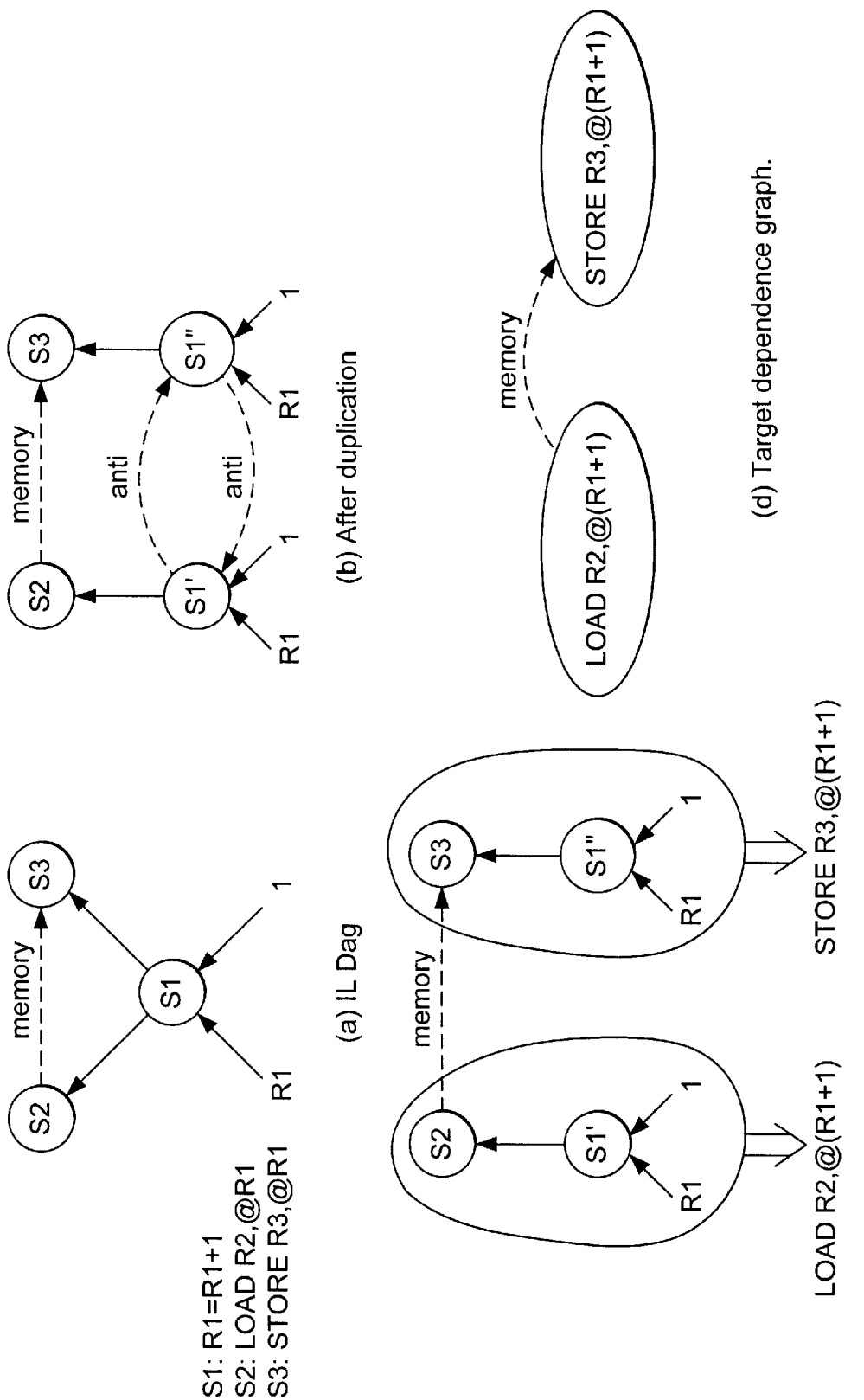
FIGS. 7(a)–(d) illustrate a cycle legality constraint.

FIG. 7(a) shows a basic block comprised of three IL instructions, S1, S2, S3, and its IL DAG. The IL DAG has a memory anti dependence edge [25] that preserves the ordering of the LOAD and STORE instructions. Note that S1 is a fan-out node. Also, if register R1 were LIVE_ON_EXIT from the basic block, there would have been an additional true dependence edge from S1 to the LIVE_ON_EXIT node for the basic block.

FIG. 7(b) shows the result after duplicating IL instruction S1, i.e., replacing it by two copies, S1' and S1". There is now a cycle in the IL DAG caused by symmetric anti dependences between S1' and S1" due to their use of register R1. (There are no output dependences because both S1' and S1" compute the same value.) However, there is no fan-out node in the IL DAG after duplication, and tree pattern matching can be performed separately on each of the two trees in FIG. 8(b).

FIG. 7(c) shows the result after tree pattern matching. IL instructions S1' and S2 are combined into one target instruction, LOAD R2,@(R1+1), and IL instructions S1" and S3 are combined into another target instruction, STORE R3,@(R1+1) (these target instructions are found in many processor architectures).

Finally, FIG. 7(d) shows the SuperNode Graph. There is no cycle in the SuperNode Graph because register R1 is a disappearing register for both S1' and S1". The memory dependence from the LOAD to the STORE is still present in the SuperNode Graph. Therefore, duplication is legal in this example.

In addition to the correctness legality constraints, the costs of duplication have to be considered to ensure that the overhead of duplication does not outweigh its benefits. Fortunately, the costs that are part of the tree pattern matching framework also can be used to control the selection of duplication.

A conservative duplication strategy was implemented in the prototype compiler such that duplication is performed only if each duplicated copy of an instruction is combined with its parent in the least-cost tree parse returned by tree pattern matching. This strategy can be extended to allow duplication so long as the total cost with duplication does not exceed the total cost returned by tree pattern matching without duplication. When the costs are equal, it has been found that it is better to select duplication over non-duplication because target instructions generated with duplication typically have more instruction-level parallelism than target instructions generated without duplication. 6. Logic of Source Code Translator This Section illustrates exemplary logic that may be used to implement the preferred embodiment of the present invention. Of course, those skilled in the art will recognize that the exemplary logic is not intended to limit the present invention. Indeed, those skilled in the art will recognize that other logic or methods or steps may be used without departing from the scope of the present invention.

FIGS. 8A–8B and 9A–9C are flowcharts that illustrate the steps performed by the source translator 116 according to the preferred embodiment of the present invention.

Figure 8A:
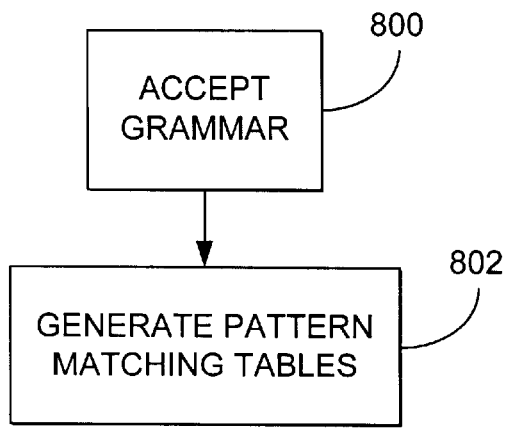
FIGS. 8A and 8B are flowcharts that illustrate the steps performed by the source translator according to the preferred embodiment of the present invention.

Referring to FIG. 8A, Block 800 represents the machine grammar 204 being accepted into the MBURG 206 and Block 802 represents the MBURG 206 generating to generate the set of pattern matching tables for a specific target processor. These steps are presented as a separate figure, because they are usually performed only once for the specific target processor and are not performed in each compilation. However, those skilled in the art will recognize that these steps could be performed at any interval.

Figure 8B:
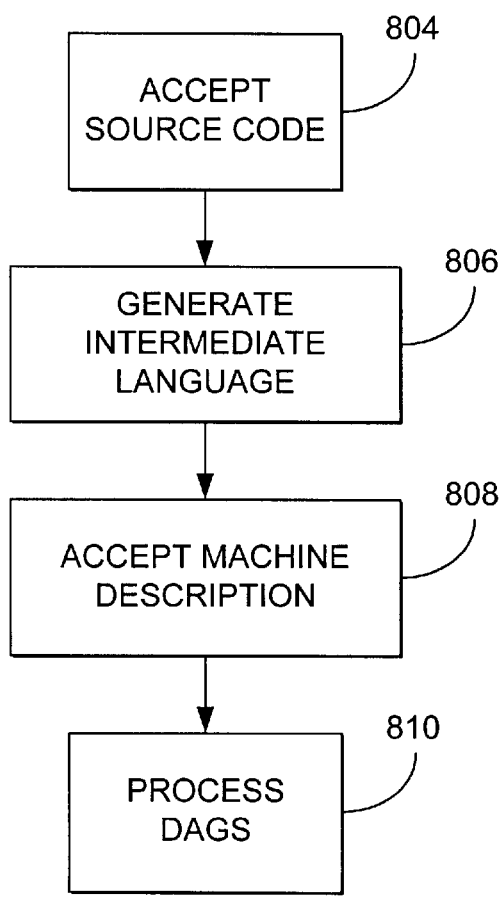

Referring to FIG. 8B, Block 804 represents the compiler front end 200 accepting the source code 122, Block 806 represents the source code 122 being translated into the intermediate language (IL) by the optimizing back-end 202, Block 808 represents both the optimizing back-end 202 and the retargetable code generator 208 accepting the machine-specific parameters (e.g., description of register sets for the target processor), and Block 810 represents the retargetable code generator 208 processing the DAGs using the partitioning and duplication methods. The logic of Block 810 is further described in FIGS. 9A, 9B, and 9C.

Figure 9A:
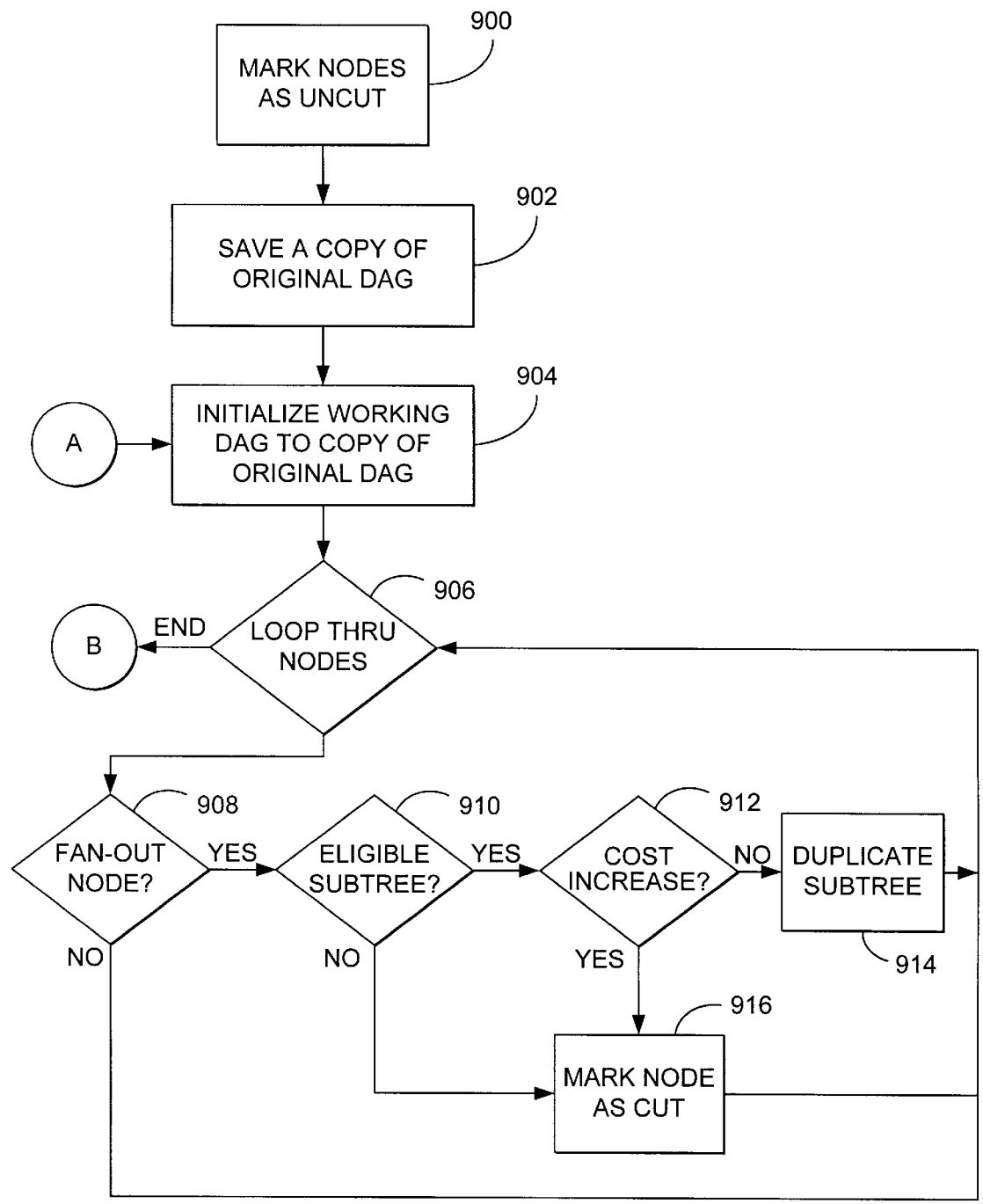
FIGS. 9A, 9B, and 9C are flowcharts that further illustrate the steps performed by the source translator in FIG. 3B according to the preferred embodiment of the present invention.

Referring to FIG. 9A, Block 900 represents the nodes all being marked as "uncut" and Block 902 represents a copy of the original DAG being saved.

Block 904 represents a "working" DAG being initialized to the value of the copy of the original DAG.

Block 906 is a "FOR" loop comprised of Blocks 908–916, which processes each node N in the DAG in topological sort order, i.e., in an order that ensures that node N is processed before any of its successors. After each node has been processed, control transfers to FIG. 9B via connector "B".

Block 908 is a decision block that determines whether the current node N is a fan-out node. If so, control transfers to Block 910; otherwise, control transfers to Block 906.

Block 910 is a decision block that determines whether the subtree of the current node N is eligible for duplication (one of the eligibility criteria is that the subtree rooted at node N must not contain a cut node). If so, control transfers to Block 912; otherwise, control transfers to Block 916.

Block 912 is a decision block that determines whether the duplication of the subtree for the current node N increases costs. If not, control transfers to Block 914; otherwise, control transfers to Block 916.

Block 914 represents the duplication of the subtree for the current node N. Thereafter, control transfers back to Block 906.

Block 916 represents the current node N being marked as a cut node. Thereafter, control transfers back to Block 906.

Figure 9B:
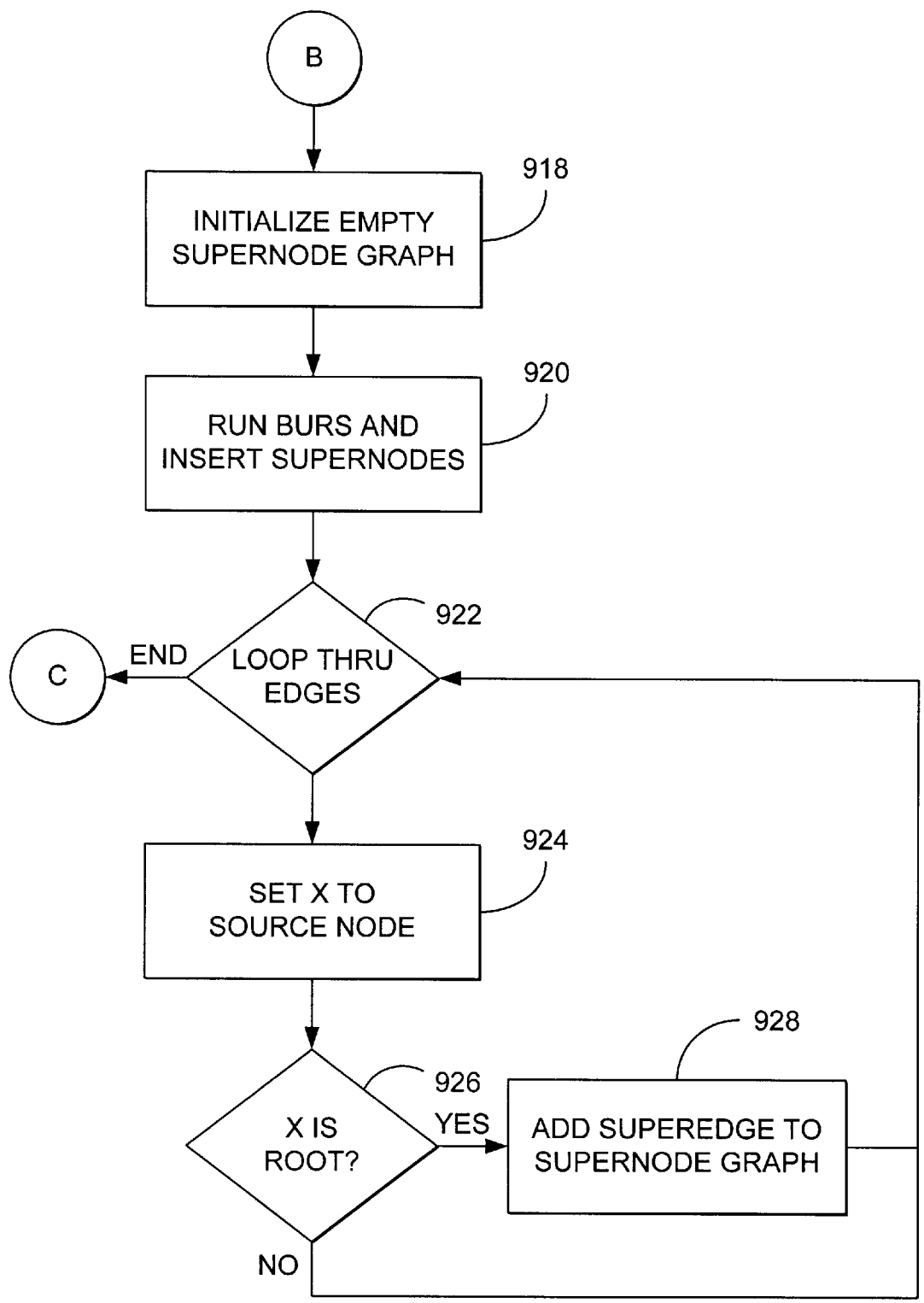

Referring to FIG. 9B, Block 918 represents the initialization of an empty SuperNode Graph.

Block 920 represents the execution of the BURS [8, 17, 24] on trees defined by true edges and cut nodes, and the insertion of resulting SuperNodes into the SuperNode Graph.

Block 922 is a "FOR" loop comprised of Blocks 924–928, which processes each edge E in the IL DAG. After all edges have been processed, control transfers to FIG. 9C via connector "C".

Block 924 represents X being set to the source node of edge E.

Block 926 is a decision block that determines whether the IL instruction X is the root of a SuperNode. If so, control transfers to Block 928; otherwise, control transfers back to Block 922.

Block 928 represents the superedge corresponding to edge E being added to the SuperNode Graph (if the superedge is not already present therein). Thereafter, control transfers back to Block 922.

Figure 9C:
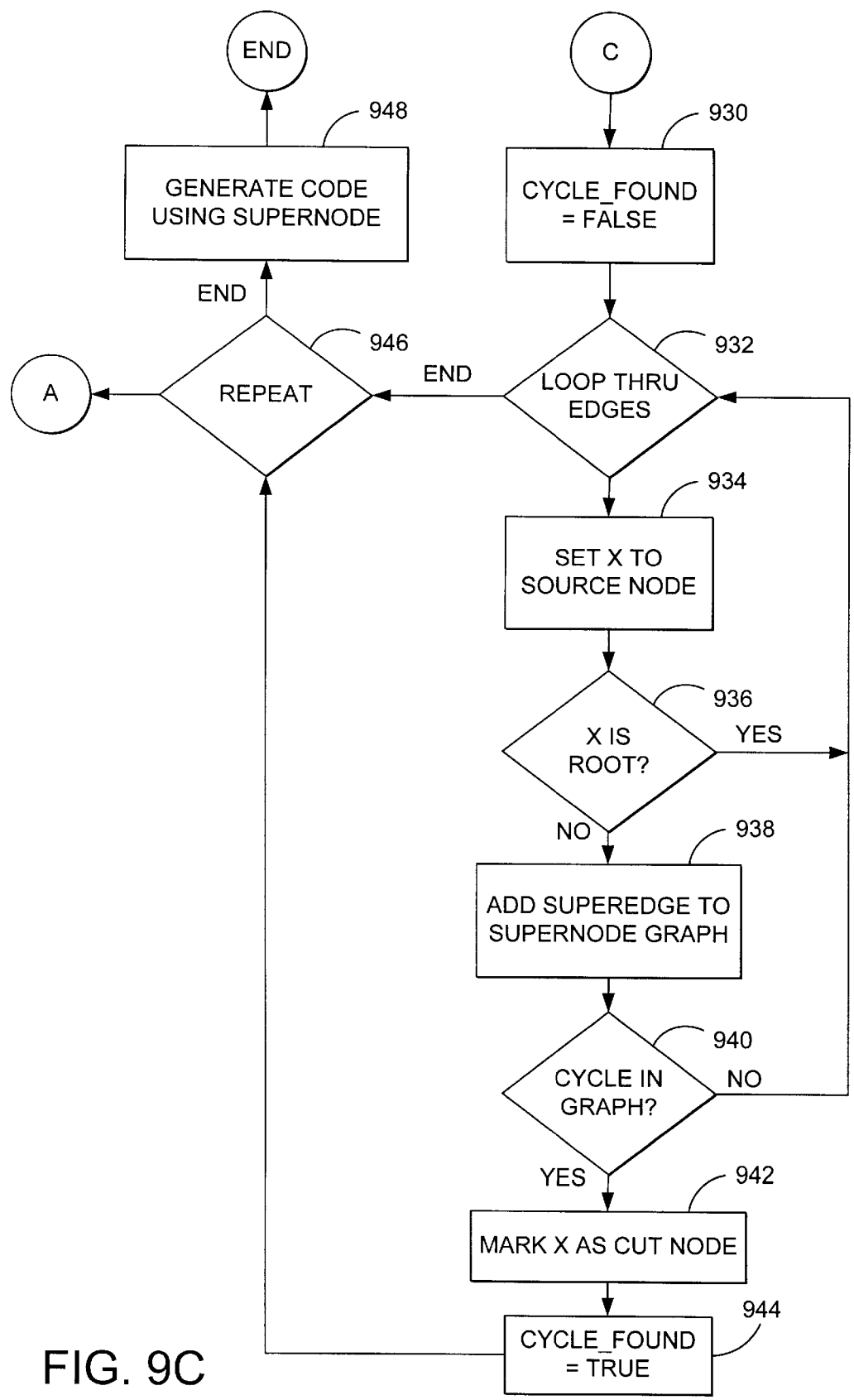

Referring to FIG. 9C (at which point the SuperNode Graph must still be acyclic), Block 930 represents the variable CYCLE_FOUND being set to "false".

Block 932 is a "FOR" loop comprised of Blocks 934–944, which processes each edge E in the IL DAG. After all edges have been processed, control transfers to Block 946.

Block 934 represents X being set to the source node of edge E.

Block 936 is a decision block that determines whether the IL instruction X is the root of a SuperNode. If so, control transfers to Block 932; otherwise, control transfers to Block 938.

At this point, edge E was not processed by previous loop, and thus Block 938 represents the superedge corresponding to DAG edge E being added to the SuperNode Graph (if the superedge is not already present therein).

Block 940 is a decision block that determines whether adding the superedge creates a cycle in the SuperNode Graph. If so, control transfers to Block 942; otherwise, control transfers back to Block 932.

Block 942 represents X being marked as a cut node and Block 944 represents the variable CYCLE_FOUND being set to "true." Thereafter, control transfers to Block 946.

Block 946 represents a "REPEAT" loop, which continues processing by transferring to FIG. 9A via connector "A" until the variable CYCLE_FOUND is set to "false". After the variable CYCLE_FOUND is set to "false", the REPEAT loop terminates and control transfers to Block 948 to generate code based on the final SuperNode partition. Thereafter, the logic ends. 7. Related Work To the best of the inventors' knowledge, there has been no prior work on partitioning the basic block dependence graph structures (DAGs) found in optimized intermediate code into trees that can be fed as input to code generators based on tree pattern matching. As described herein, the present invention builds on the tree pattern matching techniques developed in the TWIG [1] and BURS [8, 17, 24] systems. The use of BURS technology in the publicly-available LCC compiler [16] has demonstrated the practicality of using tree pattern matching techniques in real compilers-the machine grammars written for various target processors are very compact, and the space and time overheads for retargetable code generation are surprisingly low.

There has been a fair amount of past work on DAG-pattern matching, i.e., techniques that match subgraphs to more general DAG patterns rather than tree patterns. Examples of DAG-pattern matching can be found in the work done on PO [11], YC[12], VPO [5], and GCC [21]. Unlike the use of dynamic programming to automate tree pattern matching, the DAG-pattern matching performed in these systems was implemented by hand, thus requiring more effort.

The work reported in [20] outlines an approach for automating DAG-pattern matching. However, the sizes of the DAG pattern machine descriptions in [20] are typically an order of magnitude larger than those required for tree pattern matching. This makes it hard to compare the approach of the present invention with the approach in [20]. If tools for practical, efficient and automatic DAG-pattern matching become available in the future, then a logical extension of the present invention would be to consider cycle-breaking and duplication in the context of SuperNodes that can be DAGs rather than just trees.

As mentioned in Section 1, it is anticipated that an important future application of the approach of the present invention will be in retargetable code generation for mobile code systems such as Omniware [3]. Mobile code systems have to address several issues including safety and retargetability. The present invention can be used to enhance the retargetability of mobile code systems. The OmniVM translators described in [3] were hand-coded for four different platforms: Mips, Sparc, PowerPC, and x86. The approach described herein can be used to build such translators with much less effort. 8. Future Work Possible directions for future work include:

Using this approach to retargetable code generation in mobile code systems such as Omniware.

Extending the present invention to tree pattern matching in a program dependence graph for multiple basic blocks, rather than just a data dependence graph for a single basic block. This would allow translation of patterns containing conditional operations to appropriate conditional-update target instructions.

Extending the prototype compiler so that combined register allocation and instruction scheduling is performed after generation of target code by using retargetable machine-parameterized methods. 9. References All of the following references are incorporated by reference herein:

[1] Alfred V. Aho, Mahadevan Ganapathi, and Steven W. K. Tjiang, Code generation using tree matching and dynamic programming, ACM TOPLAS, 11(4), October 1989.

[2] A. V. Aho, R. Sethi, and J. D. Ullman, Compilers: Principles, Techniques, and Tools, Addison-Wesley, 1986.

[3] Ali-Reza Ald-Tabatabai, Geoff Langdale, Steven Lucco, and Robert Wahbe, Efficient and Language-Independent Mobile Programs, In Proceedings of the SIGPLAN '96 Conference on Programming Language Design and Implementation, ACM Press, May 1996.

[4] M. Auslander and M. Hopkins, An Overview of the PL.8 Compiler, Proceedings of the Sigplan '82 Symposium on Compiler Construction, 17(6):22–31, June 1982.

[5] M. E. Benitez and Jack W. Davidson, A portable global optimizer and linker, Proceedings of the SIGPLAN '88 Conference on Programming Language Design and Implementation, 23(7):329–338, July 1988, Atlanta, Ga.

[6] Robert J. Blainey, Instruction Scheduling in the TOBEY compiler, IBM Journal of Research and Development, 38(5):577–593, September 1994.

[7] The Standard Performance Evaluation Corporation, SPEC CPU95 Benchmarks, http://open.specbench.org/osg/cpu95/, 1997.

[8] R. R. Henry C. W. Fraser and T. A. Proebsting, Burg-fast optimal instruction selection and tree parsing, In Proceedings of the ACM SIGPLAN Notices, 1992.

[9] Ron Cytron and Jeanne Ferrante, What's in a Name? Or the Value of Renaming for Parallelism Detection and Storage Allocation, Proceedings of the 1987 International Conference on Parallel Processing, pages 19–27, August 1987.

[10] Ron Cytron, Jim Lipkis, and Edith Schonberg, A Compiler-Assisted Approach to SPMD Execution, Supercomputing 90, November 1990.

[11] Jack W. Davidson and Christopher W. Fraser, The design and application of a retargetable peephole optimizer, ACM TOPLAS, 2(2), April 1980.

[12] Jack W. Davidson and Christopher W. Fraser, Code Selection through Object Code Optimization, ACM TOPLAS, 6(4), October 1984.

[13] David A. Dunn and Wei-Chung Hsu, Instruction Scheduling for the HP PA-8000, Proceedings of MICRO-29, pages 298–307, December 1996.

[14] H. Emmelmann, F-W. Schroeer, and R. Landwehr, BEG—a Generator for Efficient Back Ends, Proceedings of then 1989 SIGPLAN Conference on Programming Language Design and Implementation, 24(7):227–237, July 1989.

[15] Christian Ferdinand, Helmut Seidl, and Reinhard Wilhelm, Tree automata for code selection, Acta Informatica, (31):741–760, 1994.

[16] C. Fraser and D. Hanson, A Retargetable C Compiler—Design and Implementation, The Benjamin/Cummings Publishing Company, Inc., 1995.

[17] C. W. Fraser, D. R. Hanson, and T. A. Proebsting, Engineering a Simple, Efficient Code—Generator Generator, ACM Letters on Programming Languages and Systems, 1(3), September 1992.

[18] M. Ganapathi and Charles N. Fischer, Afix grammar-driven code generation, ACM Transactions on Programming Languages and Systems, 4(7):560–599, 1985.

[19] R. S. Glanville and Susan L. Graham, A new method for compiler code generation, Proceedings of the Fifth Annual ACM Symposium on Principles of Programming Languages, January 1978.

[20] Roger Hoover and Kenneth Zadeck, Generating Machine-Specific Optimizing Compilers, Proceedings of the ACM SIGPLAN-SIGACT Symposium on Principles of Programming Languages, pages 219–229, January 1996.

[21] Richard Kenner, Targeting and Retargeting the GNU Optimizing Compiler, Tutorial presented at POPL '95, 1995.

[22] Steven S. Muchnick, Advanced Compiler Design & Implementation, Morgan Kaufmann Publishers, Inc., San Francisco, Calif., 1997.

[23] Kevin O'Brien, Kathryn M. O'Brien, Martin Hopkins, Arvin Shepherd, and Ron Unrau, XIL and YIL: The Intermediate Languages of TOBEY, SIGPLAN Notices, 30(3):71–82, March 1995, (Proceedings of IR '95 Workshop help in conjunction with POPL '95 in San Francisco, Calif.).

[24] Todd A. Proebsting, Simple and Efficient BURS table generation, Proceedings of the ACM SIGPLAN '92 Conference on Programming Language Design and Implementation, San Francisco, Calif., June 1992.

[25] Michael J. Wolfe, Optimizing Supercompilers for Supercomputers, Pitman, London and The MIT Press, Cambridge, Mass., 1989, In the series, Research Monographs in Parallel and Distributed Computing.

[26] Daniel Yellin. Speeding up dynamic transitive closure for bounded degree graphs, Acta Informatica, 30:369–384, 1993.

10. Conclusion

This concludes the description of the preferred embodiment of the invention. The following describes some alternative embodiments for accomplishing the present invention.

For example, any type of computer, such as a mainframe, minicomputer, work station or personal computer, could be used with the present invention.

In addition, any compiler, interpreter, or assembler could benefit from the present invention. Still further, in alternative embodiments, the particular form of the source code, object code, intermediate language, etc., could differ without departing from the scope of the present invention. Moreover, different logic and/or data structures than those described herein may be used in alternative embodiments without departing from the scope of the present invention.

In summary, the present invention discloses a method, apparatus, and article of manufacture for performing retargetable object code generation for a specific processor by matching tree patterns in directed acyclic graphs derived from the source code.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of programming a first processor, comprising the steps of:

(a) receiving a series of programming language statements comprising source code into a memory of a second processor;

(b) translating the source code into object code in the memory of the second processor, wherein the translating step comprises the steps of:

(1) generating an intermediate language from the source code in the memory of the second processor, wherein the intermediate language is comprised of one or more directed acyclic graphs (DAGs);

(2) partitioning the DAGs into one or more trees in the memory of the second processor; and (3) generating the object code in the memory of the second processor, including retargeting the object code to the first processor by matching patterns in the trees of the DAGs.

2. The method of claim 1 above, further comprising the step of identifying legality constraints for the partitioning step.

3. The method of claim 1 above, wherein the DAGs are optimized basic block DAGs.

4. The method of claim 1 above, wherein the partitioning step further comprises the step of partitioning the DAGs into trees that contain only true dependence edges and in which each node has at most one true dependence out-edge.

5. The method of claim 1 above, wherein the tree is a fan-in tree.

6. The method of claim 5 above, wherein the generating step further comprises the step of decomposing the fan-in tree into one or more patterns, which are represented as a second-level partition of each fan-in tree into subtrees.

7. The method of claim 1 above, wherein the partitioning step comprises the step of finding a minimum cost legal two-level partition of the DAG into subtrees.

8. The method of claim 1 above, further comprising the step of selectively performing duplication of the intermediate language to further improve the quality of the generated object code.

9. The method of claim 1 above, further comprising the step of optimizing the intermediate language.

10. The method of claim 1 above, wherein the optimized intermediate code is processor-independent.

11. The method of claim 1 above, further comprising the step of generating one or more pattern matching tables for use by the generating step from a grammar for the first processor.

12. The method of claim 1 above, wherein the first processor is of a different type from the second processor.

13. The method of claim 1 above, wherein the first processor is of a same type as the second processor.

14. An apparatus for programming a first processor, comprising:

(a) a second processor having a memory;

(b) means, performed by the second processor, for receiving a series of programming language statements comprising source code into the memory;

(c) means, performed by the second processor, for translating the source code into object code in the memory of the second processor, wherein the means for translating comprises:

(1) means for generating an intermediate language from the source code in the memory of the second processor, wherein the intermediate language is comprised of one or more directed acyclic graphs (DAGs);

(2) means for partitioning the DAGs into one or more trees in the memory of the second processor; and (3) means for generating the object code in the memory of the second processor, including retargeting the object code to the first processor by matching patterns in the trees of the DAGs.

15. The apparatus of claim 14 above, further comprising means for identifying legality constraints for the means for partitioning.

16. The apparatus of claim 14 above, wherein the DAGs are optimized basic block DAGs.

17. The apparatus of claim 14 above, wherein the means for partitioning further comprises means for partitioning the DAGs into trees that contain only true dependence edges and in which each node has at most one true dependence out-edge.

18. The apparatus of claim 14 above, wherein the tree is a fan-in tree.

19. The apparatus of claim 14 above, wherein the means for generating further comprises means for decomposing the fan-in tree into one or more patterns, which are represented as a second-level partition of each fan-in tree into subtrees.

20. The apparatus of claim 14 above, wherein the means for partitioning comprises means for finding a minimum cost legal two-level partition of the DAG into subtrees.

21. The apparatus of claim 14 above, further comprising means for selectively performing duplication of the intermediate language to further improve the quality of the generated object code.

22. The apparatus of claim 14 above, further comprising means for optimizing the intermediate language.

23. The apparatus of claim 14 above, wherein the optimized intermediate code is processor-independent.

24. The apparatus of claim 14 above, further comprising means for generating one or more pattern matching tables for use by the means for generating from a grammar for the first processor.

25. The apparatus of claim 14 above, wherein the first processor is of a different type from the second processor.

26. The apparatus of claim 14 above, wherein the first processor is of a same type as the second processor.

27. An article of manufacture embodying logic for programing a first processor, the logic comprising the steps of:
  (a) receiving a series of programming language statements comprising source code into a memory of a second processor;
  (b) translating the source code into object code in the memory of the second processor, wherein the translating step comprises the steps of:
    (1) generating an intermediate language from the source code in the memory of the second processor, wherein the intermediate language is comprised of one or more directed acyclic graphs (DAGs);
    (2) partitioning the DAGs into one or more trees in the memory of the second processor; and
    (3) generating the object code in the memory of the second processor, including retargeting the object code to the first processor by matching patterns in the trees of the DAGs.

28. The method of claim 27 above, further comprising the step of identifying legality constraints for the partitioning step.

29. The method of claim 27 above, wherein the DAGs are optimized basic block DAGs.

30. The method of claim 27 above, wherein the partitioning step further comprises the step of partitioning the DAGs into trees that contain only true dependence edges and in which each node has at most one true dependence out-edge.

31. The method of claim 27 above, wherein the tree is a fan-in tree.

32. The method of claim 31 above, wherein the generating step further comprises the step of decomposing the fan-in tree into one or more patterns, which are represented as a second-level partition of each fan-in tree into subtrees.

33. The method of claim 27 above, wherein the partitioning step comprises the step of finding a minimum cost legal two-level partition of the DAG; into subtrees.

34. The method of claim 27 above, further comprising the step of selectively performing duplication of the intermediate language to further improve the quality of the generated object code.

35. The method of claim 27 above, further comprising the step of optimizing the intermediate language.

36. The method of claim 27 above, wherein the optimized intermediate code is processor-independent.

37. The method of claim 27 above, further comprising the step of generating one or more pattern matching tables for use by the generating step from a grammar for the first processor.

38. The method of claim 27 above, wherein the first processor is of a different type from the second processor.

39. The method of claim 27 above, wherein the first processor is of a same type as the second processor.

* * * * *

UNITED STATES PATENT AND TRADEMARK OFFICE
CERTIFICATE OF CORRECTION

PATENT NO.     : 6,292,938 B1                                                        Page 1 of 1
DATED          : September 18, 2001
INVENTOR(S)    : Vivek Sarkar, Mauricio Jose Serrano and Barbara Bluestein Simons It is certified that error appears in the above-identified patent and that said Letters Patent is hereby corrected as shown below:

Column 17,
Line 13, "14" should read -- 18 --

Column 18,
Line 27, after "DAG", strike ";"

Signed and Sealed this

Third Day of June, 2003

JAMES E. ROGAN
*Director of the United States Patent and Trademark Office*